US 6,590,907 B1

(12) United States Patent
Jones et al.

(10) Patent No.: US 6,590,907 B1
(45) Date of Patent: Jul. 8, 2003

(54) INTEGRATED CIRCUIT WITH ADDITIONAL PORTS

(75) Inventors: Andrew M. Jones, Bristol (GB); John A. Carey, Bristol (GB); Bernard Ramanadin, Palo Alto, CA (US); Atsushi Hasegawa, Sunnyvale, CA (US)

(73) Assignee: STMicroelectronics Ltd. (GB)

(*) Notice: Subject to any disclaimer, the term of this patent is extended or adjusted under 35 U.S.C. 154(b) by 0 days.

(21) Appl. No.: 09/411,799

(22) Filed: Oct. 1, 1999

(51) Int. Cl.[7] .............................................. G06F 13/00
(52) U.S. Cl. ...................... 370/489; 370/502; 361/728; 361/736; 361/748; 361/760; 361/764; 361/785; 710/2; 710/9; 710/62; 710/107; 710/300
(58) Field of Search ................................ 370/257, 364, 370/438, 450, 453, 454, 456, 489, 502; 361/728, 731, 733, 736, 748, 749, 760, 761, 764, 785; 710/2, 3, 5, 9, 11, 12, 32, 62, 63, 64, 107, 105, 300, 301, 302, 201

(56) References Cited

U.S. PATENT DOCUMENTS

| | | | |
|---|---|---|---|
| 4,814,981 A | 3/1989 | Rubinfeld | 364/200 |
| 5,251,311 A | 10/1993 | Kasai | 395/425 |
| 5,386,565 A | 1/1995 | Tanaka et al. | 395/700 |
| 5,423,050 A | 6/1995 | Taylor et al. | 395/575 |
| 5,434,804 A | 7/1995 | Bock et al. | 364/579 |
| 5,440,705 A | 8/1995 | Wang et al. | 395/421.1 |
| 5,448,576 A | 9/1995 | Russell | 371/22.3 |
| 5,452,432 A | 9/1995 | Macachor | 395/425 |
| 5,455,936 A | 10/1995 | Maemura | 395/183.11 |
| 5,479,652 A | 12/1995 | Dreyer et al. | 395/183.06 |
| 5,483,518 A | 1/1996 | Whetsel | |
| 5,488,688 A | 1/1996 | Gonzales et al. | 395/183.1 |
| 5,490,279 A * | 2/1996 | Golbert et al. | 710/301 |
| 5,530,965 A | 6/1996 | Kawasaki et al. | 395/800 |
| 5,539,616 A * | 7/1996 | Kikinis | 361/686 |
| 5,570,375 A | 10/1996 | Tsai et al. | 371/22.3 |
| 5,590,354 A | 12/1996 | Klapproth et al. | 395/800 |
| 5,596,734 A | 1/1997 | Ferra | 395/825 |
| 5,598,551 A | 1/1997 | Barajas et al. | 395/484 |

(List continued on next page.)

FOREIGN PATENT DOCUMENTS

| | | | | |
|---|---|---|---|---|
| EP | 0165600 B1 | 11/1991 | | G06F/13/36 |
| EP | 0636976 B1 | 2/1995 | | G06F/11/00 |

(List continued on next page.)

OTHER PUBLICATIONS

Yamada, T. et al "Experimental Research on a Hot Swappable Bus System" American Control Conference, IEEE, vol. 1, Jun. 4–6, 1997, pp. 213–217.*

Richard York; Real Time Debug for System–on–Chip Devices; Jun. 1999; pp. 1–6.

*Primary Examiner*—Hassan Kizou
*Assistant Examiner*—Anh-Vu H Ly
(74) *Attorney, Agent, or Firm*—Lisa K. Jorgenson

(57) ABSTRACT

An integrated circuit which has a packet router to which a plurality of functional modules are connected by respective ports is described. One of the ports acts as a socket port for an expansion socket. The expansion socket provides a plurality of additional expansion ports to which additional functional modules can optionally be connected. All the ports connected to the packet router, including the expansion socket port, preferably lie in a common address space for the integrated circuit.

15 Claims, 7 Drawing Sheets

U.S. PATENT DOCUMENTS

| | | | |
|---|---|---|---|
| 5,608,881 A | 3/1997 | Masumura et al. .......... 395/306 |
| 5,613,153 A | 3/1997 | Arimilli et al. ............. 395/821 |
| 5,627,842 A | 5/1997 | Brown et al. .............. 371/22.3 |
| 5,657,273 A | 8/1997 | Ayukawa et al. ....... 395/189.01 |
| 5,682,545 A | 10/1997 | Kawasaki et al. .......... 395/800 |
| 5,704,034 A | 12/1997 | Circello ................. 395/183.14 |
| 5,708,773 A | 1/1998 | Jeppesen, III et al. .. 395/183.06 |
| 5,724,549 A | 3/1998 | Selgas et al. ................ 395/468 |
| 5,724,553 A * | 3/1998 | Shigeeda ..................... 711/170 |
| 5,737,516 A | 4/1998 | Circello et al. ........ 395/183.14 |
| 5,751,621 A | 5/1998 | Arakawa ............... 364/748.07 |
| 5,768,152 A | 6/1998 | Battaline et al. ....... 364/551.01 |
| 5,771,240 A | 6/1998 | Tobin et al. ................ 371/22.1 |
| 5,774,701 A | 6/1998 | Matsui et al. ............... 395/556 |
| 5,778,237 A | 7/1998 | Yamamoto et al. .... 395/750.04 |
| 5,781,558 A | 7/1998 | Inglis et al. ................ 371/21.1 |
| 5,796,978 A | 8/1998 | Yoshioka et al. ........... 395/416 |
| 5,802,389 A * | 9/1998 | McNutt ......................... 710/1 |
| 5,828,825 A | 10/1998 | Eskandari et al. ..... 395/183.03 |
| 5,832,248 A | 11/1998 | Kishi et al. ................. 395/376 |
| 5,835,963 A | 11/1998 | Yoshioka et al. ........... 711/207 |
| 5,841,639 A * | 11/1998 | Schnoor et al. ............. 361/796 |
| 5,848,247 A | 12/1998 | Matsui et al. ............... 395/284 |
| 5,860,127 A | 1/1999 | Shimazaki et al. ......... 711/167 |
| 5,862,387 A | 1/1999 | Songer et al. .............. 395/728 |
| 5,867,726 A | 2/1999 | Ohsuga et al. ......... 395/800.32 |
| 5,884,092 A | 3/1999 | Kiuchi et al. .......... 395/800.35 |
| 5,896,550 A | 4/1999 | Wehunt et al. .............. 395/846 |
| 5,918,045 A | 6/1999 | Nishii et al. ................ 395/584 |
| 5,930,523 A | 7/1999 | Kawasaki et al. ..... 395/800.32 |
| 5,930,833 A | 7/1999 | Yoshioka et al. ........... 711/210 |
| 5,944,841 A | 8/1999 | Christie ....................... 714/38 |
| 5,950,012 A | 9/1999 | Shiell et al. ................. 395/712 |
| 5,953,538 A | 9/1999 | Duncan et al. ............. 395/842 |
| 5,956,477 A | 9/1999 | Ranson et al. ......... 395/183.06 |
| 5,978,874 A | 11/1999 | Singhal et al. ............... 710/107 |
| 5,978,902 A | 11/1999 | Mann ......................... 712/227 |
| 5,983,017 A | 11/1999 | Kemp et al. ................. 395/704 |
| 5,983,379 A | 11/1999 | Warren ....................... 714/727 |
| 6,023,735 A * | 2/2000 | Smith et al. .................... 710/3 |
| 6,058,464 A * | 5/2000 | Taylor ........................ 711/217 |
| 6,088,752 A * | 7/2000 | Ahern ........................ 710/303 |
| 6,108,199 A * | 8/2000 | Bonardi et al. ............. 361/686 |
| 6,185,704 B1 * | 2/2001 | Pawate et al. .............. 714/719 |
| 6,216,185 B1 * | 4/2001 | Chu ............................ 710/303 |
| 6,226,723 B1 * | 5/2001 | Gustavson et al. .......... 711/170 |
| 6,252,791 B1 * | 6/2001 | Wallace et al. ................ 365/52 |
| 6,401,157 B1 * | 6/2002 | Nguyen et al. ............. 710/302 |
| 6,414,868 B1 * | 7/2002 | Wong et al. ................... 365/51 |
| 6,480,947 B1 * | 11/2002 | Hasegawa et al. .......... 711/167 |
| 6,487,623 B1 * | 11/2002 | Emerson et al. ............ 710/302 |
| 2002/0007432 A1 * | 1/2002 | Ahern ........................ 710/305 |

FOREIGN PATENT DOCUMENTS

| | | | |
|---|---|---|---|
| EP | 0636976 A1 | 2/1995 | ........... G06F/11/00 |
| EP | 0652516 A1 | 5/1995 | ........... G06F/11/00 |
| EP | 0702239 A2 | 3/1996 | ........ G01R/31/3173 |
| EP | 0720092 A1 | 7/1996 | ........... G06F/11/00 |
| EP | 0933926 A1 | 8/1999 | ............. H04N/5/00 |
| EP | 0945805 A1 | 9/1999 | ........... G06F/12/08 |
| EP | 0959411 A1 | 11/1999 | ........... G06F/13/24 |
| JP | PCT/JP96/02819 | 9/1996 | ............. G06F/9/46 |
| JP | 8320796 A | 12/1996 | ............. G06F/9/46 |
| JP | 8329687 A | 12/1996 | ........... G11C/15/00 |
| JP | 9212358 A | 8/1997 | ............. G06F/9/38 |
| JP | 9311786 A | 12/1997 | ............. G06F/9/38 |
| JP | 10106269 A | 4/1998 | ........... G06F/12/08 |
| JP | 10124484 A | 5/1998 | ........... G06F/17/10 |
| JP | 10177520 A | 6/1998 | ........... G06F/12/10 |

* cited by examiner

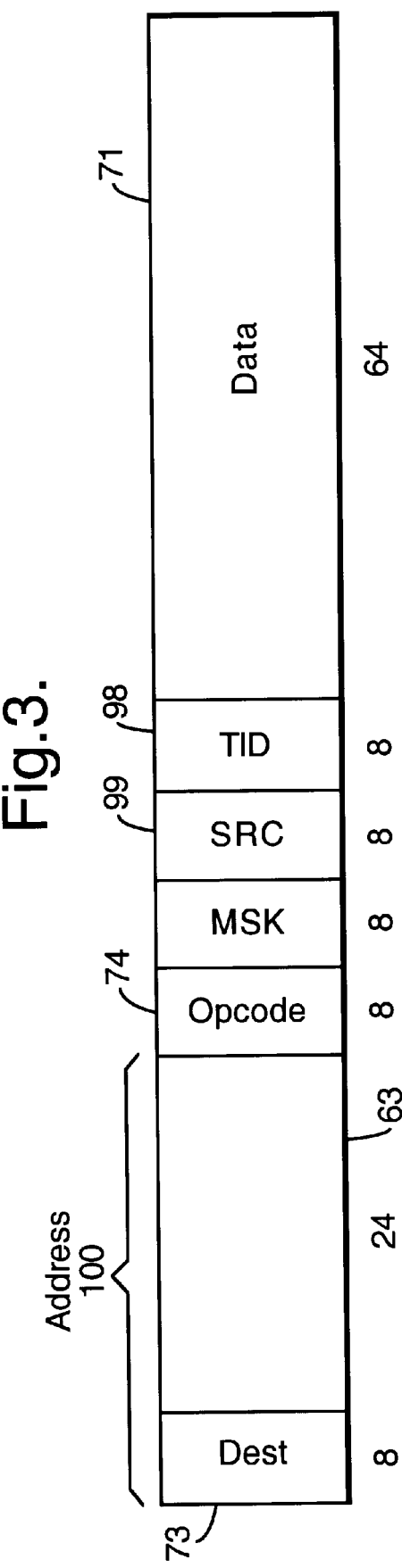
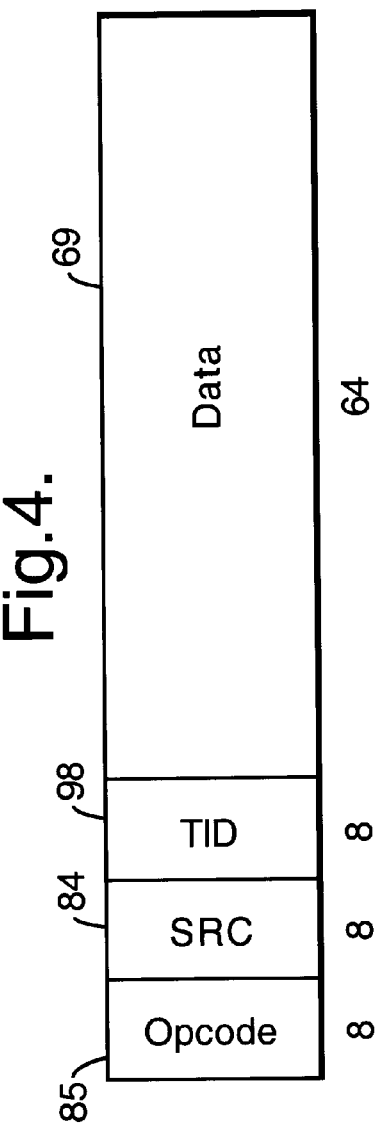

INTEGRATED CIRCUIT WITH ADDITIONAL PORTS

FIELD OF THE INVENTION

The present invention relates to an integrated circuit which has a packet router to which a plurality of ports are connected, each port connecting to a functional module. Additional ports for additional functional modules are provided.

BACKGROUND OF THE INVENTION

Computer systems and integrated circuit processors exist which implement transactions with the dispatch and receipt of packets. Request packets define an operation to be performed and response packets indicate that a request has been received and whether or not the operation defined in a request packet has been successfully carried out. The integrated circuit processor can comprise a plurality of functional modules connected to a packet router for transmitting and receiving the request and response packets. The increasing ability to incorporate a greater number of more complex modules on a single chip means that it is now possible to integrate a high performance CPU with a number of complex modules using a high performance bus in a system on a chip. Generally, the design process is such that the architecture of a processor is designed and the functional modules which are required are determined. Once an architecture has been designed, an interconnect is designed to suit that architecture and verify it on a per system basis. This effectively means that each system has to be treated as a new system as regards the verification of the interconnect, with the resulting design time delays which result. In an attempt to reduce this, designs are often partitioned into immutable blocks which do not change from system to system and changeable blocks which are redesigned for each instance of a family of systems. More often than not there is tension between having a high performance interconnect and one which does not require re-design and re-verification.

Although the principal of partitioning a design into immutable blocks and changeable blocks is sound, it is normally quite difficult to partition a design such that a CPU core, standard peripherals and a high performance routing bus can be in the immutable block. This is because in order to get high performance interconnects multiple paths are used over which standard broadcast techniques are expensive. Also, the routing control must be able to detect erroneous accesses. This implies that the routing control mechanism for the system must have a complete address map so that it can deduce accesses to vacant areas of the address map. Such accesses are erroneous accesses. Adding extra modules into such a system involves advising the system control that such accesses may not be erroneous and, in some cases, may require remapping of the memory to accommodate the additional modules. It is desirable if the system is capable of returning clear error indications if accesses are attempted to non existent modules.

It is an aim of the present invention to allow a verified design of an integrated circuit which comprises a plurality of functional modules connected to a packet router to be expanded with additional modules without significantly impacting the verification process and without the need of redesign of the "core".

SUMMARY OF THE INVENTION

According to one aspect of the present invention there is provided an integrated circuit comprising: a plurality of functional modules each connected to a packet router via a respective port, wherein each port is associated with a range of addresses within a common memory space for the integrated circuit; each functional module having packet handling circuitry for generating and receiving packets conveyed by the packet router, each packet including a destination indicator identifying a destination of the packet by identifying an address within the common memory space; wherein each port is operable to transfer packets between its associated functional module and the packet router according to a predetermined protocol, the integrated circuit further comprising; an expansion socket connected to the packet router via a socket port operable to transfer packets between the packet router and the expansion socket using said predetermined protocol, the expansion socket having a plurality of expansion ports for connection to respective expansion modules and including routing control logic for routing packets between the packet router and any functional modules connected to the expansion ports.

It is desirable if the ports connected to the packet router, including the socket port, each have an associated respective address range lying within a common memory space for the integrated circuit. This means that the arbitration logic for the circuit can arbitrate for the flow of packets on the packet router between the functional modules and the expansion socket because, as far as the arbitration control is concerned, the expansion socket behaves as an additional port.

Each expansion port of the expansion socket can be associated with a module enable signal which indicates whether or not a functional module is connected to a particular expansion port. This allows the expansion port to read the address contained in the packet, identify the addressed expansion port and determine whether or not an expansion module is connected to the addressed expansion port. If no expansion module is connected to the addressed expansion port, the routing control logic can be arranged to generate an error response packet for transmission onto the packet router via the socket port.

The routing control logic can also be arranged to generate an error response packet if the destination indicated by the request packet does not form part of the address range associated with the socket port. That is, a clear error indication can be made in the event of erroneous accesses to the expansion socket.

Each expansion port can be arranged to transfer packets between an expansion module connected to the port and the routing control logic in accordance with the predetermined protocol. This has the advantage that there is no need for an adapter in the expansion socket but merely relatively simple buffer logic for buffering packets to be transmitted to and from the packet router.

The invention also provides an expansion socket module for connection in an integrated circuit, the expansion socket module comprising: a socket port for connecting the expansion socket module to a packet router of the integrated circuit; a plurality of expansion ports for connecting the expansion socket to respective expansion modules; and control means for receiving packets from the packet router, each packet including a destination indicator identifying a destination of the packet and for determining to which expansion port the packet should be directed.

For a better understanding of the present invention and to show how the same may be carried into effect reference will now be made by way of example to the accompanying drawings.

BRIEF DESCRIPTION OF THE DRAWINGS

FIGS. 3 and 4 are packet formats of request and response packets respectively conveyed by the packet router;

DESCRIPTION OF THE PREFERRED EMBODIMENT

Figure 1:
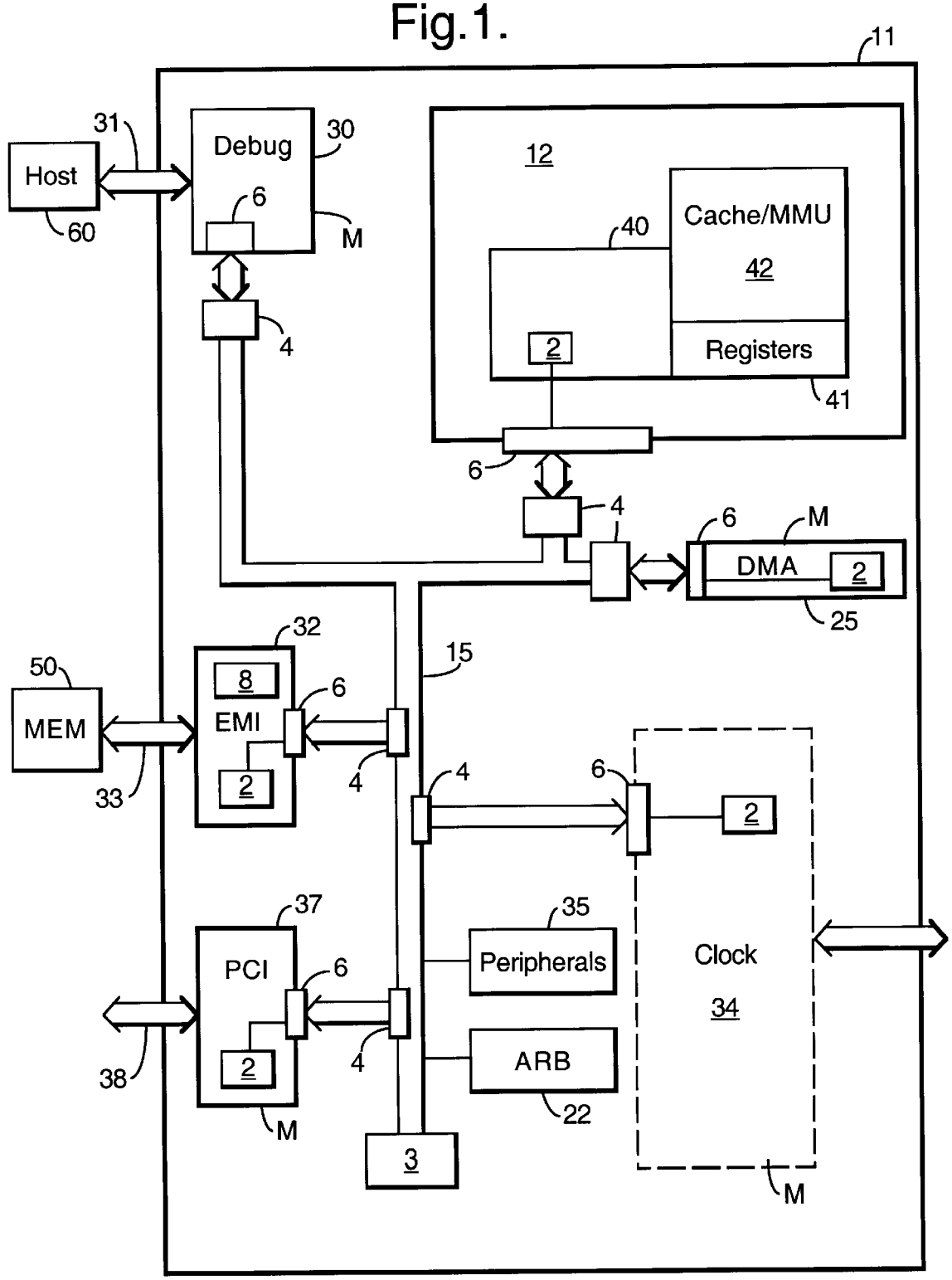
FIG. 1 is a block diagram of a processor embodied as an integrated circuit with an external memory.

FIG. 1 illustrates an integrated circuit according to an embodiment of the invention. On each chip 11 a CPU unit 12 is connected to a plurality of modules M by a data and address path 15 arranged to carry bit packets in parallel form. The modules as well as the CPU unit 12 each include packet handling circuitry 2 used in the generation and receipt of bit packets on the path 15. The path 15 is referred to herein as a packet router or routing bus. Two main types of packet are used on the data and address path 15, each including a destination indicator or address to indicate the required destination module connected to the path 15. The packets include request packets which are generated by an initiator module and response packets which are generated by a target module. A module may act as both an initiator and a target. Response packets are of two types, ordinary responses or error responses. The modules M as well as the CPU unit 12 each have packet handling circuitry 2 for handling packet formation and receipt of requests, ordinary responses and error responses.

Reference numeral 3 denotes an expansion socket the function of which will be described later. This also includes packet handling circuitry.

The routing bus 15 provides bi-directional connections to each module. In this example the bus consists of parallel request and response buses and a dedicated control bus provided respectively for each module so as to link the modules to an arbitration unit 22. Each module is connected to the routing bus via a port 4 and is provided with an interface 6 incorporating a state machine so as to interchange control signals and data between the port 4 and the interface 6.

Signals from the interfaces 6 are supplied to central control logic which forms part of an arbitration unit 22. The arbitration unit 22 issues request routing controls and response routing controls to the routing bus network 15.

In the example shown in FIG. 1, the various modules 14 include a debug module 30 which includes an external link 31 for transmitting packets across the chip boundary, an external memory interface EMI 32 having an external bus connection 33 leading to an external memory 50, clock circuitry 34, various peripheral interfaces 35, a peripheral component interface PCI 37 with an external connection 38, a DMA unit 25 for effecting memory accesses as well as the arbitration unit 22. The CPU unit 12 includes a plurality of instruction execution units 40, a plurality of registers 41, and a cache 42. The CPU unit 12 also includes packet handling circuitry 2 connected to the execution units 40. The routing bus 15 is arranged to transmit to the modules M both request and response packets for effecting memory access transactions. These packets may be generated by software as a result of instruction execution by a CPU or by hardware responsive to detection of a packet. The packets may be generated on-chip and distributed on the bus 15 or generated off-chip and supplied to the on-chip bus 15 through an external connection such as the link 31 associated with the debug module 30.

The CPU can be operated in a conventional manner receiving instructions from a program memory and effecting data read or write operations with the cache 42 on-chip. Additionally external memory accesses for read or write operations may be made through the external memory interface 32 and bus connection 33 to the external memory 50.

The debug module 30 provides an important external communication which may be used for example in debugging procedures. The on-chip CPU 12 may obtain instruction code (by memory access packets) for execution from an external source such as a debugging host 60 communicating through the link 31. Communications on the routing bus 15 are carried out in bit parallel format. It is possible to reduce the parallelism of packets obtained from the routing bus 15 so that they are output in bit serial format through the link 31.

Each packet is constructed from a series of cells or tokens, the end of the packet being identified by an end of packet (eop) signal. The construction of the cells is discussed in more detail later. Briefly, each packet cell comprises a number of fields which characterise the packet. Each packet is transmitted by a source module and is directed to a destination module. An initiator can issue request packets and act on response packets. A target can receive and act on requests and issue responses. Thus, a source module may be an initiator or a target depending on the nature of the packet. The source module uses its associated port 4 to transmit a packet onto the routing bus 15. The routing bus 15 arranges for the packet to be routed to the port associated with the destination module. The destination module then receives that packet from its associated port. The source and destination modules can be the same.

Figure 2:
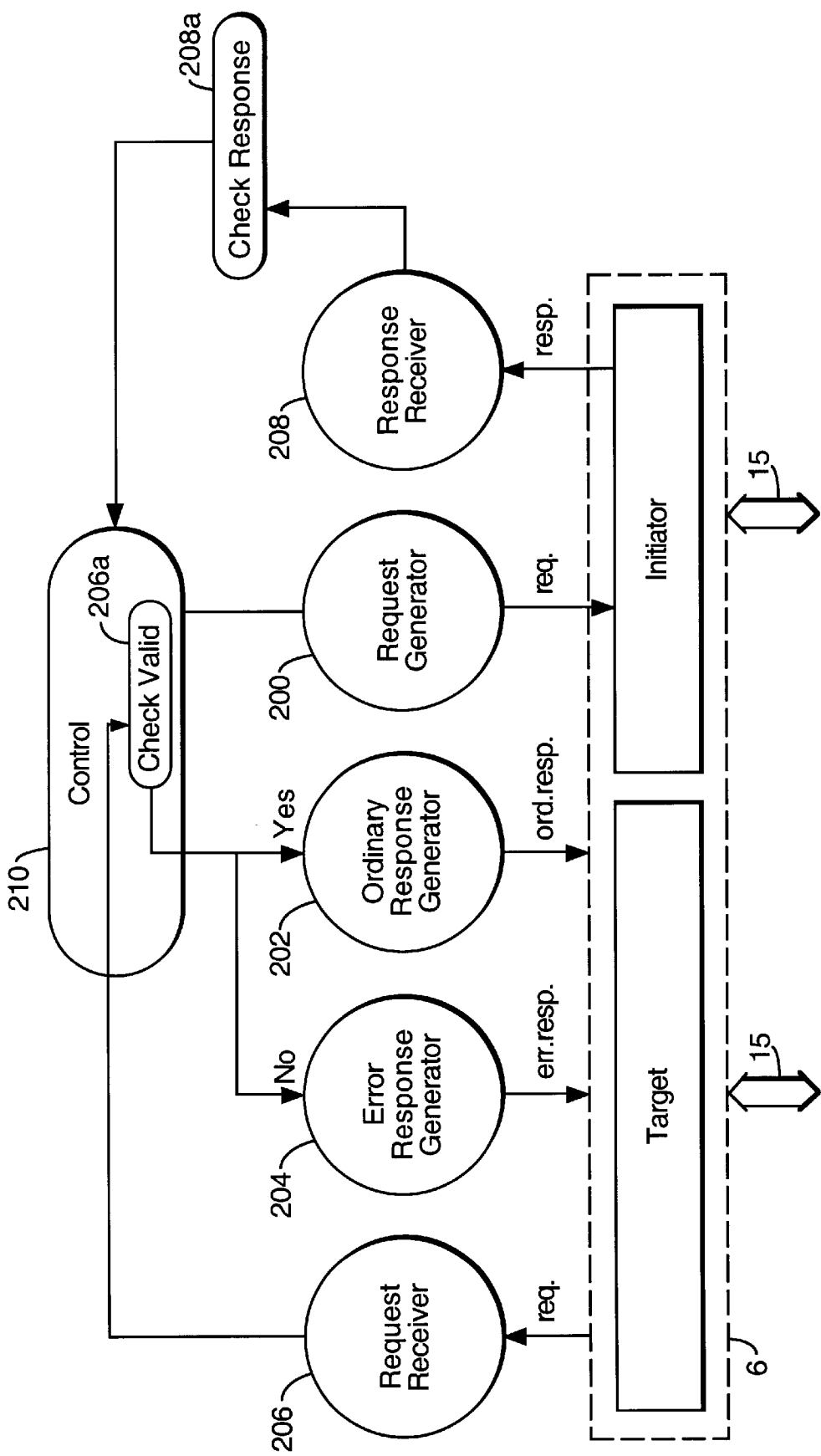
FIG. 2 shows the packet handling logic.
Figure 6:
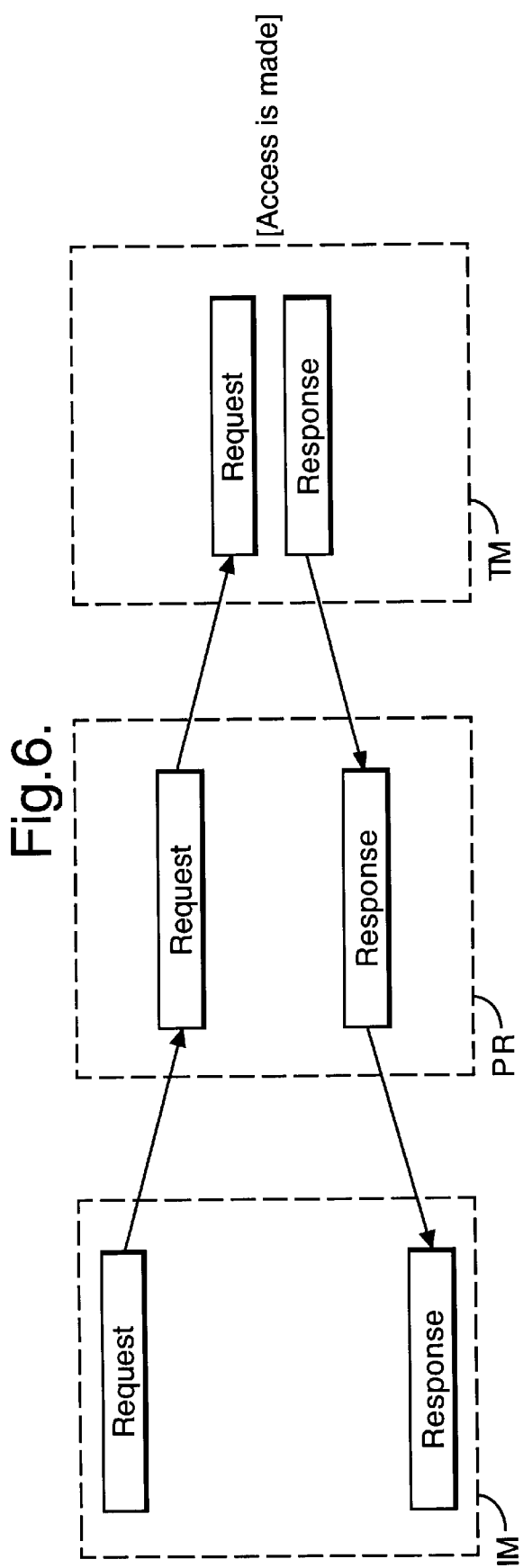
FIG. 6 illustrates a transaction.

A transaction is an exchange of packets that allows a module to access the state of another module. With reference to FIG. 6, a transaction consists of the transfer of a request packet from a source module IM to a destination module TM, followed by the transfer of a response packet from that destination module (now acting as a responding module) back to the source module which made the original request. The request packet initiates a transaction and its contents determine the access to be made. The response packet completes the transaction and its contents indicate the result of the access. A response packet also indicates whether the request was valid or not. If the request was valid, a so-called ordinary response packet is sent. If the request was invalid, an error response packet is transmitted. Some modules act only as initiators and thus their packet handling circuitry 2 is capable only of the generation of request packets. Some modules act only as targets, and therefore their packet handling circuitry 2 is capable only of generating response packets. In that case, both ordinary responses and error responses can be generated. However, some modules are capable of acting both as initiators or as targets, and their packet handling circuitry is capable of generating both request and response type packets. A logic diagram for the relevant parts of a module capable of both these functions is shown in FIG. 2. The packet handler 2 comprises request generator logic 200, ordinary response generator logic 202, error response generator logic 204, request packet receiver logic 206, and response packet receiver logic 208. These are all under the general functional control of a control logic block 210. A request packet is constructed by a requesting module when that module needs to make an access to a particular target module. As discussed more fully later, the address of the target module is recorded in the request packet destination field. The requesting module acts as a source of the request packet and sends that packet into the routing bus 15. The routing bus 15 arranges for that request packet to be routed from its source to its destination. The destination receives the request packet from the routing bus 15. The request packet receiver logic 206 checks whether or not the request is valid at 206*a*. If it is valid, an ordinary response packet is generated by the ordinary response generator logic 202 and the module services the requested access according to the information in the received request packet. If the request is not valid, the error response generator logic 204 generates an error response packet.

A response packet (ordinary or error) is constructed in order to reply to the request packet. The module which originated the request packet is recorded in the response packet's destination field. The responding module is the source of the response packet and sends that packet onto the routing bus 15. This is done by the module interface 6. The response receiver logic 208 receives the response packet from the routing bus 15 and checks the response at 208*a*. If the response can be matched to the original request, the transaction is completed.

The format of the multibit packets used on the routing bus 15 in the microcomputer are illustrated by way of example in FIGS. 3 and 4. FIG. 3 shows the information carried by each request cell.

Each packet is constructed from a series of cells framed using an end of packet (eop) signal. Each request cell comprises a 32-bit address field which indicates the destination address of the packet. In the described embodiment, an address comprises an 8-bit destination field 73 DEST followed by a 24-bit offset field 63 which identifies a memory location within the destination. The offset information is present in request packets to identify the particular memory location at which the request is targeted. The destination field 73 is a 1-byte field used to route the packet to the destination or target module. A byte 74 conveys the opcode which identifies the nature of the requested access. For example, the opcode can define a load word access for reading a register value and a store word access for writing a register value. A SRC byte 99 is a source field which identifies the source module and which is used as a return address for a response packet. A transaction field byte TID 98 conveys a unique transaction number which is used by the requester to associate responses with requests. The transaction number enables a module to identify response packets corresponding to respective request packets in cases where a plurality of request packets have been sent before response packets have been received for each request packet. A 64-bit data field 71 holds data to be conveyed with the request.

FIG. 4 illustrates the construction of a response packet cell. If the response packet contains more information than a single cell, it is constructed from a sequence of cells framed using a response end of packet (r_eop) signal. The response packet includes an opcode byte 85 which denotes the nature of the requested transaction, a byte 84 which identifies the source module of the requesting packet which gave rise to the response and which acts as the return address for the response packet, a transaction field byte 98 and a data field 69. The transaction field byte of a response packet holds a copy of the transaction field byte 98 of the corresponding request packet.

Figure 5:
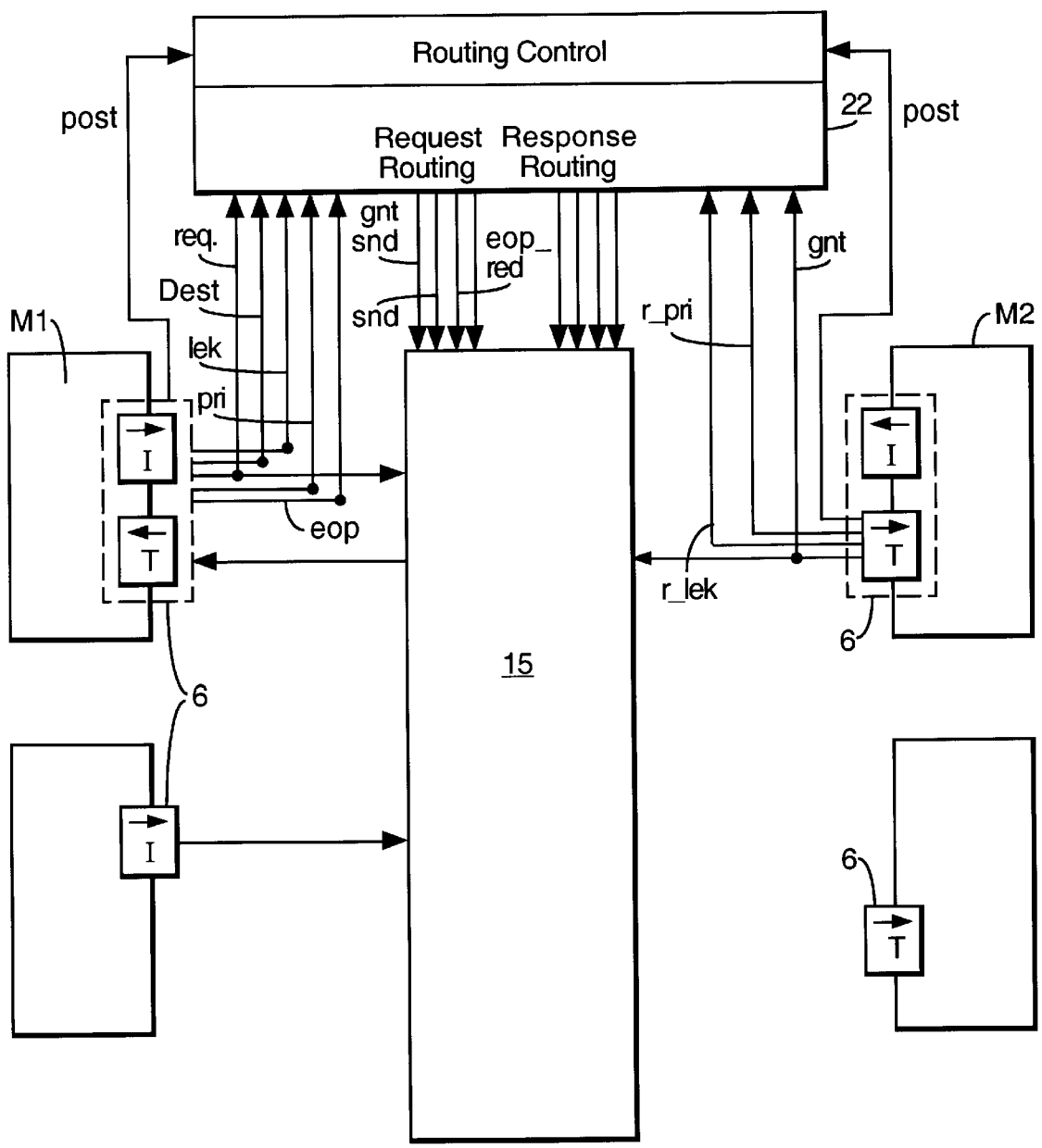
FIG. 5 is a block diagram more clearly illustrating the routing control signals.

A simple arbitration mechanism which can be used in the routing, bus will now be described with reference to FIG. 5. When a module has a packet to send to another module, for example from the CPU unit 12 to the EMI module 32, it first signals this by asserting a request signal req to a dedicated line connecting that module to the central arbitration unit 22. In FIG. 5 M1 is the initiator module and M2 the target module. It also outputs an eight bit signal (DEST) to indicate to the arbitration unit 22 the intended destination of the packet it wishes to transmit. A module M which is able to receive a packet from the routing bus 15 will assert a grant signal gnt to the central arbitration unit 22 regardless of whether a packet is available to be fed to that destination or not. When the central arbitration unit 22 determines that a module wishes to send a packet to a destination and independently the destination has indicated that it is able to receive a packet from the bus 15, the unit 22 arranges for the transfer to take place. The unit 22 asserts a "grant send" signal gnt_snd to the appropriate interface 6 causing the sending module to put the packet onto the bus 15. The arbitration unit 22 then asserts a "send" signal snd which signals to the receiving module that it should accept the transfers currently on the bus 15. The packet transmission concludes when the sender asserts an "end of packet send" signal concurrently with the last transfer of packet data on the bus 15. The control asserts an "end of packet received" signal eop_rcd to the receiving module which causes it to cease accepting.

Although this description is made with reference to request packets, a similar arbitration mechanism applies for response packets. The necessary signals are omitted from FIG. 5 for the sake of clarity.

Figure 7:
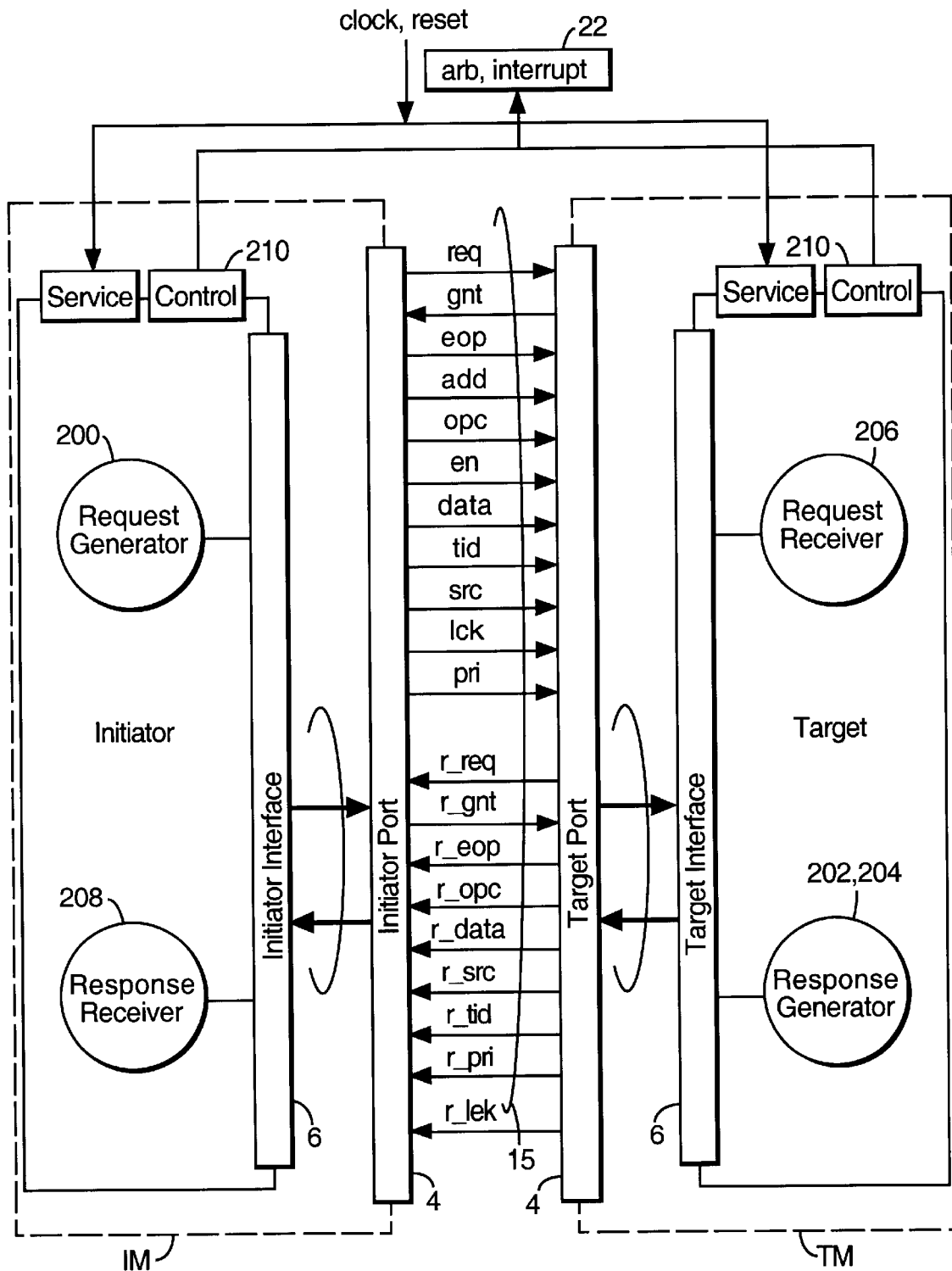
FIG. 7 is a block diagram illustrating the interface signals of ports connected to the routing bus.

As described earlier, each module M is connected to the routing bus 15 via a port 4. Each port 4 supports a plurality of functions depending on the functionality of the attached module. FIG. 7 illustrates the signals which are supplied between ports 4 of respective initiator and target modules to support a range of functions. In the diagram of FIG. 7, each line conveyed between the ports 4 is marked with a signal name. These signal names are used in the following to denote the signals carried by appropriate wires, without reference numerals for the sake of clarity of the diagram of FIG. 7. The same signal names are used in FIG. 5. Some of the signals are generated by control logic in the module, while other signals are generated from fields in the packets which are formed by the packet handling circuitry by each module. Thus, the initiator module includes control logic 210, request generator logic 200 and response receiver logic 208. The target module also includes control logic 210 and further includes request receiver logic 206 and a response generator which is labelled 202,204. Thus, the ordinary response generator logic and the error response generator logic illustrated in FIG. 2 have been combined into one block for the purposes of explanation of FIG. 7.

In the initiator module, the control logic 210 generates request req and end of packet eop signals. The request generator logic formulates a request packet as described earlier which causes the following signals to be generated:

address, add
opcode, opc
mask, en (short for byte enable)
data,
transaction number, tid
source identifier, src
lock, lck and
priority, pri.

The function of these signals and how they are derived from the packet fields is discussed below.

In addition, the initiator module receives the following signals. A response end of packet signal r_eop is received by the control logic 210 as is the grant signal gnt. The response receiver logic 208 receives the following response packet signals r_opc, r_data, r_src, r_tid, r_pri and r_lck. The grant signal gnt, the response end of packet signal r_eop are generated by the control block 210. The remaining signals are formulated from the packet which is generated by the response generator.

The function of these signals and how they are derived from the packet fields is discussed below.

Request (req) Ready to Send Data

This is driven by an initiator module IM and is used to indicate that it is ready to transfer a request or element of a request across the interface. If this signals is asserted the request content and framing signals are valid.

Initiators indicate they have data to send by asserting request and expect a grant in this or subsequent cycles to complete the transfer.

Grant (gnt) Ready to Accept Data

This is driven by a target module TM and is used by the target to indicate it is ready to accept data. A data or cell transfer across the interface occurs when the initiator is ready to send and the target is ready to accept. i.e. both request and grant are asserted at a rising clock edge.

Targets indicate they are able to accept data by asserting grant and expect a request in this or subsequent cycles to complete the transfer.

End of Packet (eop) Final Cell of Packet

This driven by the initiator and indicates this is the final cell of a request packet.

Lock (lck) Transaction Lock

This indicates to the system that this transaction is made up or more than one request/response pairs. It acts as a general mechanism to link two or more request packets to make a linked compound operation.

Address (add) the Transaction Target Address

This is the address of the target module, and the location within the target module the operation will occur on.

Opcode (opc) the Operation Associated with the Transaction

This defines the transaction operation. It is not generally interpreted by the interconnect or transport medium. The opcode information remains constant across all request cells associated with the transaction.

Compound operations may be built from multiple request/response packets linked via the lock mechanism or which have a casual relationship between two independent operations such as the flush operation.

Mask (en) Defines the Bytes Within the Cell on Which the Target Should Complete the Operation mask<0>is associated with data<7:0>, and so forth to the most significant byte.

Data Defines the Data being Carried with the Cell

The data field is made up of a set of byte quantities, each byte being associated uniquely with a specific byte enable bit. Each byte is organised as a bit little endian quantity. The data field may contain multiple bytes, these are organised in a byte significant manner.

Data quantities larger than the natural bus width are always send using incrementing addresses, with the address wrapping at the $2^n$ boundary associated with that data quantity.

Source (src) Source Identifier

This identifies the source of the transactions to the system. It allows the system (and target modules) to associate a series of transactions with a specific source of data.

Identifier (tid) this Defines the Transaction Number

This signal allows each transaction to be uniquely labelled. The transaction number of a request is used in the associated response.

Priority (pri) this Defines the Transaction Priority

This bit labels the transaction with an urgency level which the system interconnect may use to implement preferential arbitration and/or overtaking. It is used only to implement system performance enhancements. It is implemented in both the request packet and its associated response packet.

Response Request (r_req) this Indicates a Response Cell is Available

An initiator should only commence a transfer if it is ready to accept the response packet.

Response Grant (r_gnt) this Indicates a Response Cell may be Accepted

Response Lock (r_lck) Transaction Lock

This indicates to the system that this transaction is made up or more than one request/response pairs. It acts as a general mechanism to link two or more response packets to make a compound operation.

Response Opcode (r_opc) Information About the Response being Presented to the Initiator That is, whether the operation was successful (ordinary response) or an error arose (error response).

Response Data (r_data) this Defines the Data being Carried with the Response Cell A response packet will contain as many response cells as it required to build a response packet to transfer the number of words required by the transaction.

Response Source (r_src) a Copy of the Source Identification Field

Response Identifier (r_tid) a Copy of the Transaction Number

These fields allow the response cell packet to be identified within a system enabling performance optimization and observability of transactions within the system. The encoding of these fields corresponds to that of the associated request fields.

Response Priority (r_pri) this Defines the Transaction Priority

This field labels the response information with an urgency level which the system interconnect may use to implement preferential arbitration.

It will be appreciated from the above that some of the signals generated across the routing bus 15 by the initiator and target modules IM, TM are supplied to the arbitration unit 22 to implement control of packet flow on the bus 15. Other signals are supplied directly from the initiator module to the destination target module. They have no function in the routing control itself.

In particular, the dest, request, grant, end of packet, lock and priority signals on both the request and response sides are utilised by the arbitration unit 22 to control packet flow. The remaining signals are not required for arbitration and are therefore routed directly from an initiator module to the destination target module.

The integrated circuit 11 is organised as a common address space. That is, each port is associated with a range of addresses within the same address space. As described above, each packet contains a destination byte 73 which identifies a port associated with the destination module for which the packet is intended and a subsequent address 63 which identifies the location within the destination module on which the transaction operation is to take place. The expansion socket 3 is also associated with a range of addresses within the address space of the integrated circuit.

Figure 8:
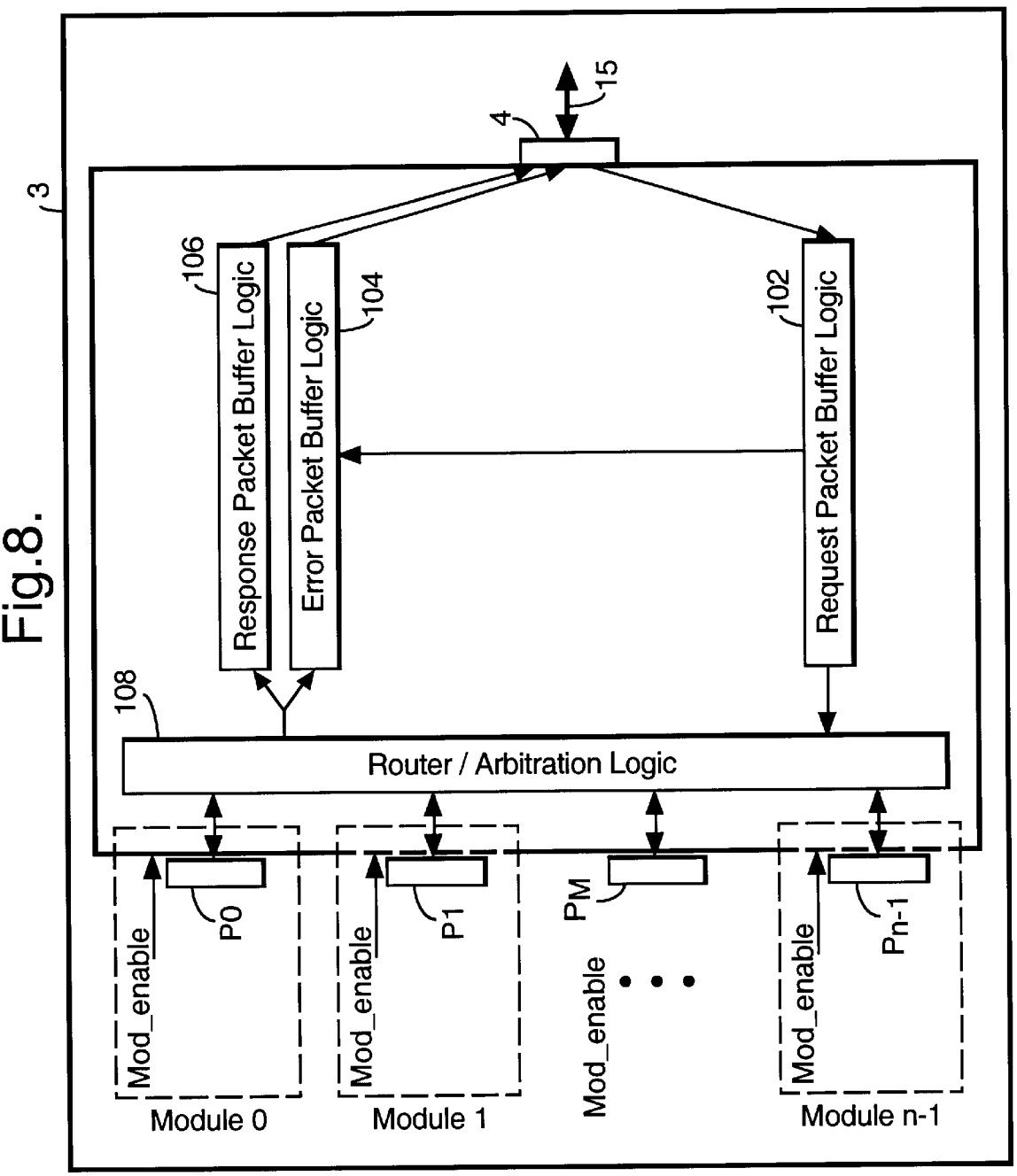
FIG. 8 is a block diagram of an expansion socket.

The expansion socket 3 allows additional functional modules to be connected to the integrated circuit 11, for example for design and verification purposes. FIG. 8 is a block diagram illustrating such an expansion socket allowing connection to a plurality n of additional functional modules labelled Module 0, Module 1 . . . Module n−1. The expansion socket 3 includes a port 4 which is as described above with reference to FIG. 7, that is, it conforms to the same protocol as the other ports 4 connected to the routing bus 15. The expansion socket 3 also includes request packet buffer logic 102, error packet buffer logic 104 and response packet buffer logic 106. The function of this logic is described later. The expansion socket 3 also includes router arbitration logic 108 which is connected to a plurality of expansion ports which are labelled P0, P1, Pm and Pn−1. Some of the ports may be connected to functional modules as indicated by Module 0, Module 1 and Module n−1. Other ports, as denoted by Pm do not have modules connected to them. These expansion ports are connected to the router/arbitration logic 108 of the expansion socket by respective control connections. These control connections carry the relevant control signals from the expansion port P0, P1, Pn−1 to the router/arbitration logic 108, these control signals being as described in relation to FIG. 5 between a normal functional module and the arbitration unit 22 connected to the bus. Thus, the router/arbitration logic 108 can implement arbitration between the additional functional modules, M0, M1 . . . Mn−1 in a similar fashion to the way in which the arbitration unit 22 controls accesses to the bus by the other functional modules of the integrated circuit. Each expansion port P0, P1, Pm, Pn−1 is associated with a module enable signal mod_enable which indicates to the expansion socket 3 whether the corresponding port is attached to a functional module or is vacant. In FIG. 8, the three mod_enable signals associated with the present modules are asserted. The signal associated with the vacant port Pm is not asserted because there is no functional module attached to the expansion port Pm. The status of the mod_enable signals is read by the router/arbitration logic 108 of the expansion socket 3.

The operation of the expansion socket will now be described. The expansion socket is described as though it is a target socket, capable of dealing with request packets and issuing appropriate responses. It will be appreciated however that the expansion socket can also act as an initiator module in the sense that it needs to be able to supply request packets formulated by the functional modules attached to it onto the bus 15 and to deal with corresponding response packets which come from the bus 15. Thus, the expansion socket can also include response receiver logic and request generator logic of the type described with reference to FIG. 2.

Request packets arrive at the port 4 attached to the expansion socket 3 from the routing bus 15 from other functional modules attached to the routing bus. The packets are held in the request buffer logic 102 which also decodes the address to determine the attached expansion module which the request is destined for. If the address does not lie in the range associated with the expansion socket, an error response is generated. If the address is a valid address, when the address has been decoded, the router/arbitration logic 108 examines the state of the mod-enable signal associated with the identified functional module. If the mod-enable signal is zero, meaning that the expansion port is vacant, the router/arbitration logic causes the error packet buffer logic 104 to construct an error response packet which is forwarded to the routing bus 15 and back to the requesting module. If the mod-enable signal is one, meaning that the appropriate functional module is connected to the appropriate expansion port, the router/arbitration logic 108 forwards the packet to the addressed functional module. The functional module generates a response packet which is routed back through the expansion port and, via the response packet buffer logic 106 through the port 4 connecting the expansion socket 3 to the routing bus 15.

In this way, the expansion socket 3 is able to generate an error response onto the routing bus 15 when an erroneous attempt is made to access the expansion socket. It is also capable of routing proper requests to functional modules in a manner consistent with the bus protocol described above.

For the sake of completeness, there follows the operations supported by the system:

Load M Bytes

Definition

Transfer a single aligned word of m bytes from the target to the initiator.

Valid sizes for m are defined to be $2^n$ were n is an integer in the range 0–6.

| Qualifiers | |
|---|---|
| address<31:n> | the address of the word to be accessed |
| address<n − 1:0> | the address of the most critical byte within the word. This ensures the system will return the critical byte as part of the first cell in the response packet. |
| mask<n − 1:0> | the mask indicates which bytes with the word are significant |
| r_data< 8 × $2^n$ − 1:0> | data to be transferred, the significance of bytes within this field is inferred from the mask information |
| r_opcode | result of operation |

Store M Bytes

Definition

Transfer a single aligned word of m bytes from the initiator to the target, overwriting the location at that address with the data transferred.

Valid sizes for m are defined to be $2^n$ where n is an integer in the range 0–6.

| Qualifiers | |
|---|---|
| address<31:n> | the address of the word to be accessed |
| address<n − 1:0> | the address of the most critical byte within the word |
| mask<n = 1:0> | the mask indicates which bytes with the word are significant |
| data<8 × $2^n$ − 1:0> | data to be transferred |

RmodW M Bytes

Definition

Transfer the value of the aligned word of m bytes from the target to the initiator, leaving the target device "locked" until a second transfer from the initiator to the target completes, replacing the information held at that address in the target device.

Valid sizes for m are defined to be $2^n$ where n is an integer in the range 0–6.

| Qualifiers | |
|---|---|
| address<31:n> | the address of the word to be accessed |
| address<n − 1:0> | the address of the most critical bytes within the word |
| mask<n − 1:0> | the mask indicates which bytes with the word are significant |
| data<8 × $2^n$ − 1:0>: | data to be transferred from the initiator to the target |
| r_data<8 × $2^n$ − 1:0> | data to be transferred from the target to the initiator |

Swap M Bytes
Definition
Exchange the value of the single aligned word of m bytes from the initiator with the data held in the target location, returning the original target data to the initiator.
Valid sizes for m are defined to be $2^n$ where n is an integer in the range 0–6.

| Qualifiers | |
|---|---|
| address<31:n> | the address of the word to be accessed |
| address<n − 1:0> | the address of the most critical byte within the word |
| mask<n − 1:0> | the mask indicates which bytes with the word are significant |
| data<8 × $2^n$ − 1:0> | data to be transferred from the initiator to the target |
| r_data<8 × $2^n$ − 1:0>: | data to be transferred from the target to initiator |

Load a Group of words of M bytes: Load Group
Definition
Transfer a group of single aligned words of m bytes from the target to the initiator.
The group consists of a number of elements, each of which contains m bytes, valid values for m are $2^n$ where n is an integer in the range 0–6.

| Qualifiers | |
|---|---|
| g*address<31:n>: | the address of the word to be accessed |
| g*address<n − 1:0> | the address of the most critical byte within the word |
| g*mask<n − 1:0> | the mask indicates which bytes within each word are significant |
| g*r_data<8 × $2^n$ − 1:0> | data to be transferred, the significance of bytes within this field is inferred from the mask information |

The group contains g* m bytes of data, and is complete when eop is asserted on the final cell of the final word to be transferred.
The operation is a mechanism for the initiator to force the system to maintain a series of possibly unrelated operations as a single element.
Store a Group of Words of M Bytes: Store Group
Definition
Transfer a group of single aligned words of size m bytes from the initiator to the target, overwriting the information at that address with the data transferred.
The group consists of a number of elements, each of which contains m bytes, valid values for m are $2^n$ where n is an integer in the range 0–6.

| Qualifiers | |
|---|---|
| g*address<31:n> | the address of the word to be accessed |
| g*address<n − 1:0> | the address of the most critical byte within the word |
| g*mask<n − 1:0> | the mask indicates which bytes with the word are significant |
| g*r_data<8 × $2^n$ − 1:0> | data to be transferred |

The group contains g* m bytes of data, and is complete when eop is asserted on the final cell of the final word to be transferred.
This operation is a mechanism for the initiator to force the system to maintain a series of possibly unrelated operations as a single element.

What is claimed is:

1. An integrated circuit comprising:
plurality of functional modules each connected to a packet router via a respective port, wherein each port is associated with a range of addresses within a common memory space for the integrated circuit;
each functional module having packet handling circuitry for generating and receiving packets conveyed by the packet router, each packet including a destination indicator identifying a destination of the packet by identifying an address within the common memory space;
wherein each port is operable to transfer packets between its associated functional module and the packet router according to a predetermined protocol, the integrated circuit further comprising;
an expansion socket connected to the packet router via a socket port operable to transfer packets between the packet router and the expansion socket using said predetermined protocol, the expansion socket having a plurality of expansion ports for connection to respective expansion modules and including routing control logic for routing packets between the packet router and any functional modules connected to the expansion ports.

2. An integrated circuit according to claim 1, wherein the ports connected to the packet router, including said socket port, each have an associated respective address range lying within a common memory space for the integrated circuit.

3. An integrated circuit according to claim 1, wherein each expansion port of the expansion socket is associated with a module enable signal which indicates whether or not a functional module is connected to a particular expansion port.

4. An integrated circuit according to claim 1, wherein each functional module comprises packet handling circuitry which includes request packet generating circuitry for generating requests packets for implementing transactions.

5. An integrated circuit according to claim 4, wherein the expansion socket comprises request packet buffer logic for receiving said request packets, reading the destination indicators and identifying the address expansion port and determining whether or not a function module is connected to the addressed expansion port.

6. An integrated circuit according to claim 5, wherein if no functional module is connected to the addressed expansion port, the routing control logic is operable to generate an error packet for transmission onto the packet router via the socket port.

7. An integrated circuit according to claim 5, wherein the routing control logic is operable to generate an error response packet if the destination indicated by the request packet does not form part of the address range associated with socket port.

8. An integrated circuit according to claim 1, wherein each expansion port is operable to transfer packets between an expansion module connected to the port and the routing control logic in accordance with the predetermined protocol.

9. An integrated circuit according to claim 3, wherein a second set of said functional modules act as target modules and each have packet handling circuitry which includes packet receiver logic for receiving said request packets and response packet generation logic for generating respective response packets.

10. An integrated circuit according to claim 1, which comprises an arbitration unit connected to the packet router for controlling the flow of packets on the packet router between said functional modules and said expansion socket.

11. An expansion socket module for connection in an integrated circuit, the expansion socket module comprising;
   a socket port for connecting the expansion socket module to a packet router of the integrated circuit;
   a plurality of expansion ports for connecting the expansion socket to respective expansion modules; and
   control means for receiving packets from the packet router, each packet including a destination indicator identifying a destination of the packet and for determining to which expansion port the packet should be directed.

12. An expansion socket module according to claim 11, wherein the control means comprises routing logic which is operable to route the packet to the identified destination expansion port when a functional module is connected to that port and to issue an error response packet when there is no functional module connected to the identified destination port.

13. An expansion socket module according to claim 11, wherein each expansion port is associated with a module enable signal which indicates whether or not a function module is connected to a particular expansion port.

14. An expansion socket module according to claim 11, which comprises request packet buffer logic for receiving said request packet, reading the address, identifying the addressed expansion port and determining or not whether an expansion module is connected to the addressed expansion port.

15. An expansion socket module according to claim 12, wherein the routing logic is operable to generate an error response packet if a destination indicated by the request packet does not form part of the address range associated with the socket port.

* * * * *